United States Patent [19]

Tiedt

[11] 4,197,432

[45] Apr. 8, 1980

[54] TELEPHONE SUBSCRIBER'S LOOP POWER CONTROL CIRCUIT

[75] Inventor: Larry M. Tiedt, Glendale Heights, Ill.

[73] Assignee: GTE Automatic Electric Laboratories Incorporated, Northlake, Ill.

[21] Appl. No.: 915,634

[22] Filed: Jun. 15, 1978

[51] Int. Cl.² .......................................... H04M 19/08
[52] U.S. Cl. ...................................... 179/77; 179/70; 179/2.51
[58] Field of Search ................... 179/70, 77, 78, 16 A, 179/16 AA, 2.5 R, 18 FA, 84 A, 18 HB; 340/347 D, 347 A; 323/22 T, 43.5, 45

[56] References Cited

U.S. PATENT DOCUMENTS

| | | | |
|---|---|---|---|
| 3,848,094 | 11/1974 | Russell | 179/70 |
| 4,087,647 | 5/1978 | Embree et al. | 179/77 |
| 4,088,843 | 5/1978 | Rogers et al. | 179/70 |

OTHER PUBLICATIONS

"A User's Handbook of D/A and A/D Converters", 1976, by Eugene R. Hnatek, pp. 190–193, Wiley & Sons.

Primary Examiner—Gerald Brigance
Attorney, Agent, or Firm—Robert J. Black; Gregory G. Hendricks

[57] ABSTRACT

A power control circuit which supplies all of the power requirements of a telephone subscriber's loop circuit in a digital telephone switching system. A central processing unit generates digital power supply selection and control signals which are decoded and stored by the power control circuit. These signals are then supplied to a selected programmable power supply for selected time durations.

9 Claims, 1 Drawing Figure

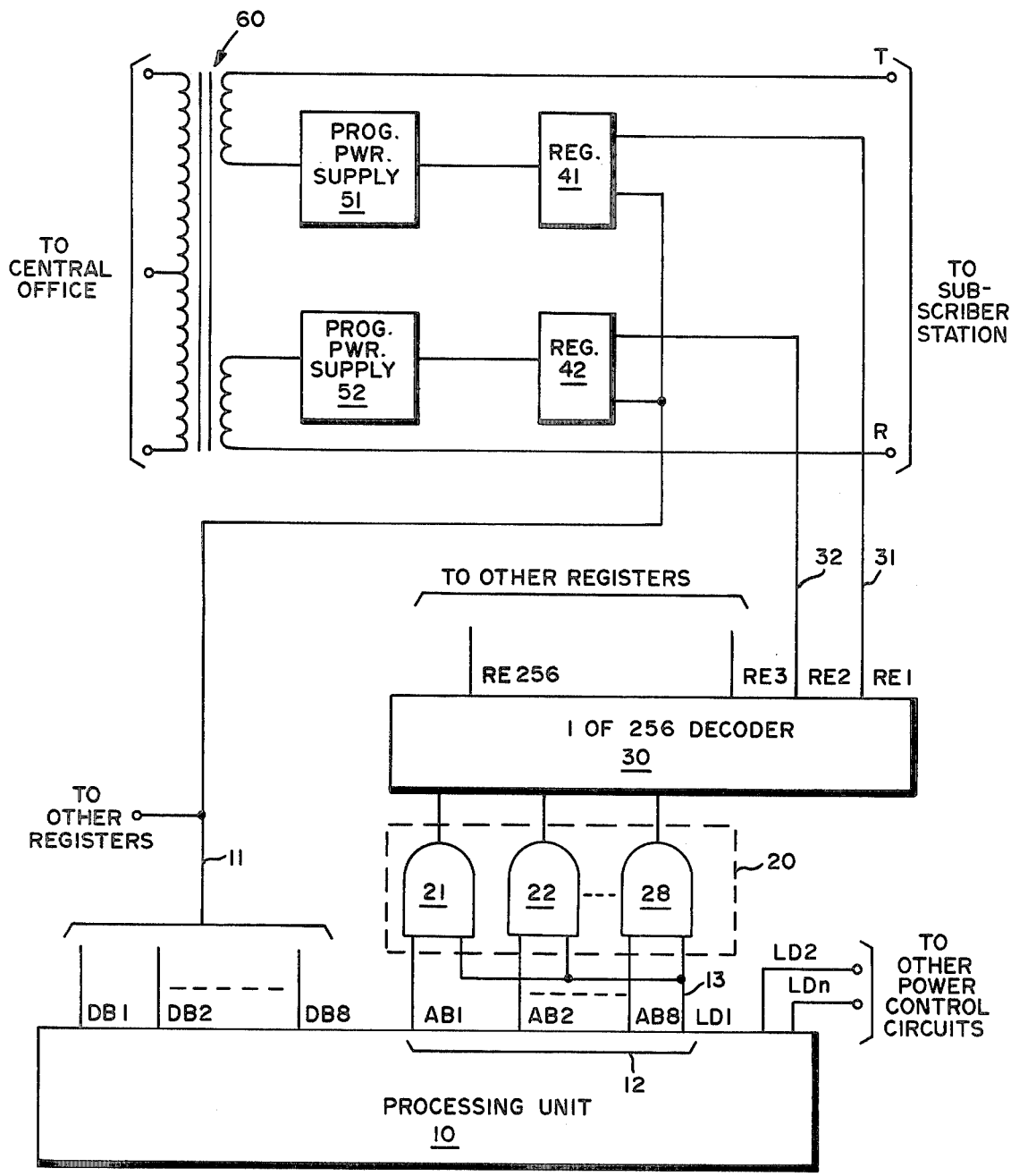

TELEPHONE SUBSCRIBER'S LOOP POWER CONTROL CIRCUIT

BACKGROUND OF THE INVENTION

1. Field of the Invention

The present invention relates to telephone subscriber loop power supplies and more particularly to a program controlled system which supplies all of the loop circuit power requirements.

2. Description of the Prior Art

Telephone subscriber loop circuits require a wide variety of control voltages, for such functions as talking battery, ringing, coin collect, coin return, etc. Typical voltages for these functions are −50V, 88V @20Hz superimposed on 40V, +130V and −130V.

In conventional analog systems these voltages were switched through the network from service circuits specially designed to provide these functions. This technique is generally not possible with a digital network because the relatively high voltages involved cannot be passed through it. It is possible to use an analog service network completely separate from the digital network but this approach is not economical for small remote digital offices.

Another solution has been to apply these voltages at the line card. It is not practical to employ a single line card to switch in all of the required voltages since not all lines require all voltages, the approach has been to use different line circuits for different applications. This requires a multiplicity of different line circuits which is not an economical solution in terms of both cost and maintenance.

The present invention solves this problem by using small low-cost digitally programmable power supplies in the line associated with each to supply all of the power requirements of the subscriber's loop circuit.

Accordingly, it is the object of this invention to provide an economical solution to the problem of supplying subscriber loop circuit power requirements without the need for specialized line circuits, service circuits or analog networks.

SUMMARY OF THE INVENTION

The present invention is a circuit which controls the application of power to the telephone subscriber loop circuits in a digital switching system. This circuit is connected between the data bus of a central or peripheral processing unit and each telephone subscriber's loop circuit so that the processing unit can control the application of power to each telephone subscriber's loop circuit by providing digital loop address and power level selected signals, on its data bus.

The power control circuit includes a register selection circuit connected to the data bus of a processing unit, storage registers connected to the data bus of the processing unit and to the register selection circuit and a plurality of programmable power supplies each of which are connected between a storage register and a telephone subscriber's loop circuit.

The telephone subscriber's loop circuit has a wide range of power requirements, such as −50V for talking battery, +130V for coin collect and 88V @20Hz superimposed on −40V for ringing. The processing unit can control the application of power for these needs by providing digital data representative of the desired power level on its data bus along with a digital data representative of the line to receive that power level and a loading signal to instruct the power control circuit as to when the data bus contains these power control signals.

Since there is one register and one programmable power supply for each loop circuit conductor, the selection circuit decodes the bits representative of the address of the power supply to be controlled in response to the loading signal, and generates a register enable signal for the the selected register. The selected register responds to this enable signal by loading the bits representative of the desired power level into the register.

Since each register is connected directly to a programmable power supply, the power supply converts the digital data representative of the power level into an analog power signal which is applied directly to the subscriber's loop circuit. This power signal will be applied to the loop circuit until the processing unit generates another loading signal to cause the control circuit to transfer digital data representative of a new power signal to the programmable power supply. By changing the data representative of the desired power level at the desired frequency, the central processing unit can cause AC signals to be applied to the loop circuit.

DESCRIPTION OF THE DRAWING

The single FIGURE of the accompanying drawing is a schematic diagram of a subscriber loop power control circuit in accordance with the present invention.

DESCRIPTION OF THE PREFERRED EMBODIMENT

Referring to the accompanying drawing, the power control circuit of the present invention is shown connected between a processing unit 10 and a telephone subscriber's station 100.

The power control circuit includes a gating circuit 20 connected to the processing unit 10, a decoding circuit 30 connected to the gating circuit, storage registers 41 and 42 connected to the decoding circuit 30 and the processing unit 10, and programmable power supplies 51 and 52, connected to storage registers 41 and 42, respectively, and to the first and second line conductors T and R, respectively, of the subscriber's loop circuit. Examples of progammable power supplies which could be utilized in this circuit are those manufactured by Kepco, Inc. and are described in their catalog, Kepco Power Supplies 146-1278, pages 98 to 105.

In a preferred embodiment, the power control circuit is equipped to provide power to 256 line connections. Since there are two programmable power supplies connected to each loop circuit, 256 programmable power supplies can satisfy the power requirements of 128 subscriber loop circuits.

Operation of the control circuit of the present invention will be understood by reference to the following; wherein initially CPU 10 will generate a loading signal LD at lead 13 and eight address bits (AB1–AB8) at leads 12.

The gating circuit 20 operates in response to the loading signal LD to transfer these 8 address bits for the selected programmable power supply from the data bus of the processing unit to the decoding circuit 30. The decoding circuit 30 decodes these 8 address bits AB-1–AB8 and generates a register enable signal RE at lead 31 for the selected one of 256 programmable power supplies. The selected register 41 operates in response to the register enable signal RE to store the power supply control bits DB1 to DB8 appearing on leads 11. The programmable power supply 51 connected to the selected register 41 responds to these stored power supply control signals DB1-DB8 by converting this digital data to a corresponding analog voltage level. This voltage level is applied to the associated line conduction of the subscriber's loop circuit until the processing unit 10 generates another loading signal with the same address bits and different power supply control bits. Since in this preferred embodiment there are two programmable power supplies connected to each loop circuit, one per conductor, the processing unit must then generate the loading, address, and power supply control signals for the second programmable power supply 52 connected to the loop circuit to provide a closed loop for current flow.

The other 254 power supplies and registers (not shown) are similarly operated in response to 254 unique power supply address bit combinations (AB1-AB8) and register enable signals.

A single version of this power control circuit could be equipped without the need for the selection cicuit. In this version, the power supply loading signal would be connected directly to the storage register.

The present power control circuit allows a digital central office to supply all of the power requirements of telephone subscriber's loop circuits without the need for a multiplicity of specialized line circuits, a multiplicity of service circuits or an analog network.

It will be obvious to those skilled in the art that numerous modifications of the present invention can be made without departing from the spirit of the invention in which shall be limited only by the scope of the claims appended hereto.

What is claimed is:

1. A telephone subscriber loop power control circuit for use in a digital telephone switching system including, at least one subscriber station and a processing unit, periodically operated to generate power supply control signals and a power supply loading signal, said power control circuit comprising:
storage means connected to said processing unit, operated in response to said power supply loading signal to store said power supply control signals;
power supply means connected between said storage means and said subscriber station, operated in response to said signals stored in said storage means to apply selected power levels for selected time durations to said subscriber stations;
said power supply means including at least first and second programmable power supplies and said subscriber station including first and second line conductors, said first programmable power supply connected to said first line conductor and said second programmable power supply connected to said second line conductor.

2. A power control circuit as claimed in claim 1, wherein: said programmable power supply comprises a digitally controlled power supply, said storage means is connected to a data bus included in said processing unit, and said processing unit is operated to transmit said power supply control signals and said power supply loading signal in digital form over said data bus to said storage means for use in controlling said power supply.

3. A telephone subscriber loop power control circuit for use in a digital telephone switching system including, a plurality of subscriber stations and at least one processing unit, periodically operated to generate power supply control signals, power supply addressing signals and a power supply loading signal, said power control circuit comprising:
selection means connected to said processing unit, operated in response to said power supply addressing signals and said power supply loaing signal, to decode said power supply addressing signals and generate a selected one of a plurality of register enable signals;
a plurality of storage means connected to said processing unit and said selection means, each operated in response to receipt of an associated register enable signal to store said power supply control signals; and
a plurality of power supply means each connected between an associated storage means and an associated subscriber station, each operated in response to said signals stored in said associated storage means to apply selected power levels for selected time durations to said associated subscriber station;
said power supply means including a plurality of first programmable power supplies and a plurality of second programmable power supplies, each of said subscriber stations include first and second line conductors, and a different one of said first programmable power supplies connected to each subscriber station first line conductor and a different one of said second programmable power supplies connected to each subscriber station second line conductor.

4. A power control circuit as claimed in claim 3, wherein: each of said programmable power supplies comprises a digitally controlled power supply, each of said storage means is connected to a data bus included in said processing unit, and said processing unit is operated to transmit said power supply control signals and said power supply loading signal in digital form over said data bus to said storage means for use in controlling said power supply.

5. A power control circuit as claimed in claim 3, wherein: said selection means comprise gating means connected to said processing unit, operated to generate power supply selection signals in response to said power supply addressing signals and said power supply loading signal; and decoding means connected between said gating means and said storage means, operated in response to said power supply selection signals to generate said register enable signals.

6. A power control circuit as claimed in claim 5, wherein: said gating means comprise a plurality of AND gates, each connected to an associated one of said data bus leads over which power supply addressing signals are transmitted by the processing unit, and each connected to a common power supply loading signal lead over which the loading signal generated by said processing unit is transmitted.

7. A power control circuit as claimed in claim 5, wherein: said decoding means comprise an N-bit, 1 of $2^N$ decoder.

8. A power control circuit as claimed in claim 3, wherein: each of said storage means comprise an N-bit storage register.

9. A power control circuit as claimed in claim 3, wherein: said processing unit is periodically operated to generate a plurality of power supply loading signals and a plurality of power control circuits are connected to said processing unit, each operated in response to common data bus signals and a unique power supply loading signal.

* * * * *